INVENTOR
JOHN L. JANNING
BY Louis A. Kline
John J. Callahan
John P. Tarlano
HIS ATTORNEYS impedance means electrically connected between the closed position of said second switch member and ground; and a capacitor electrically connected between said first and second switch members and ground, said capacitor charged through said first switch member to either one of said two voltage sources in accordance with the information to be stored and said capacitor discharged through said second switch member and said impedance means developing an electrical signal across said impedance means representative of the value of the stored information.

2. A information storage device for storing binary valued information comprising:

a first field-effect transistor having an input electrode, an output electrode and a control electrode, a second field-effect transistor having an input electrode, an output electrode and a control electrode, said control electrode electrically connected to the output electrode of said first transistor, information supply means supplying a first potential for binary one information and a second potential for binary zero information, said supply means electrically connected to the input electrode of said first transistor, control means electrically connected to the control electrode of said first transistor controlling the conduction of said first transistor.

supply means electrically connected to the input electrode of said second transistor supplying a source of potential to be conducted through said second transistor in response to the control electrode of said second transistor, impedance means electrically connected to the output electrode of said second transistor, and a capacitor electrically connected between the control electrode of said second transistor and ground, said capacitor charged to the potential of said information supply means through said first transistor and electrically controlling the conduction of said second transistor in response to said supply means.

3. The information storage device according to claim 2 wherein said first and second field-effect transistors are P-enhancement-mode insulated gate field-effect transistors.

4. The information storage device according to claim 2 further including regenerating means electrically coupled between the output electrode of said second transistor and the input electrode of said first transistor to maintain the charge potential on said capacitor.

5. A memory system comprising:

a plurality of memory cell storage means arranged to represent a unit of information having a codal representation equal to number of cells, an information supply means supplying the codal representation of a unit of information, an input control conductor electrically connecting all of said plurality of memory cell storage means with said information supply means, an input supply conductor electrically connecting each cell storage means with said information supply means, output means, an output control conductor electrically connecting all of said plurality of memory cell storage means with said output means, an output sense conductor electrically connecting each cell storage means with said output means, and regeneration means electrically coupled between said output sense conductor and said input supply conductor, said regenerating means operatively responsive to the said output control conductor to transfer the electrical signal generated by said cell storage means on said output sense conductor to said input supply conductor to retain said information within said memory cell storage means.

INVENTOR
JOHN L. JANNING
BY Louis A Kline
John J. Callahan
John P. Tarlano
HIS ATTORNEYS

READ-ONLY MEMORY CIRCUIT

BACKGROUND OF THE INVENTION

Paul David Dodd and George L. Owens, in U.S. Pat. No. 3,187,309, issued June 1, 1965, disclose a read-only memory card which comprises a punch-coded array of capacitors, whose plates are built upon either side of a nonconductive card. Each possible capacitor position of a complete array of capacitors is interrogated to determine which positions have a capacitor located thereat. By this means, the information, which has been stored in said punched read-only memory, is read out. The coded capacitor array of Dodd and Owens is read by charging the capacitors present and sensing the charge on these capacitors.

The present invention relates to a read-only memory card comprising a coded array of dielectric coated gate electrodes upon one side of a nonconductive substrate, rather than a capacitor plate on each side of an nonconductive card. The read-only memory card is read by a read-only memory card reader having an array of source electrode-semiconductor material-drain electrode elements, by forming field effect transistors below the gate electrodes of the read-only memory card.

Dodd and Owens do not show a coded array of dielectric coated gate electrodes mounted upon a nonconductive substrate to form a read-only memory. They do not read information in said read-only memory card by completing source electrode-semiconductor material-drain electrode elements of a read-only memory card reader to form field effect transistors. They do not determine the presence of field effect transistors by placing a gate voltage on the read-only memory and sequentially sensing for a source-drain current through each source electrode-semiconductor material-drain electrode element.

SUMMARY OF THE INVENTION

The present invention relates to a read-only memory circuit comprising a complete array of source electrode-semiconductor material-drain electrode elements disposed on a nonconductive supporting substrate; a coded array of dielectric coated gate electrodes mounted on another nonconductive supporting substrate, said coded array of dielectric coated gate electrodes being against said complete array of elements, in register therewith, and dielectrically insulated therefrom; means for applying a gate voltage to said coded array of dielectric coated gate electrodes to reduce the resistance of the semiconductor material of the elements in register therewith; and means for applying a source-drain voltage to each source electrode-semiconductor material-drain electrode element to sense for the presence of a gate electrode above the source electrode-semiconductor material-drain electrode element.

DESCRIPTION OF THE PREFERRED EMBODIMENT

Figures 1, 2:
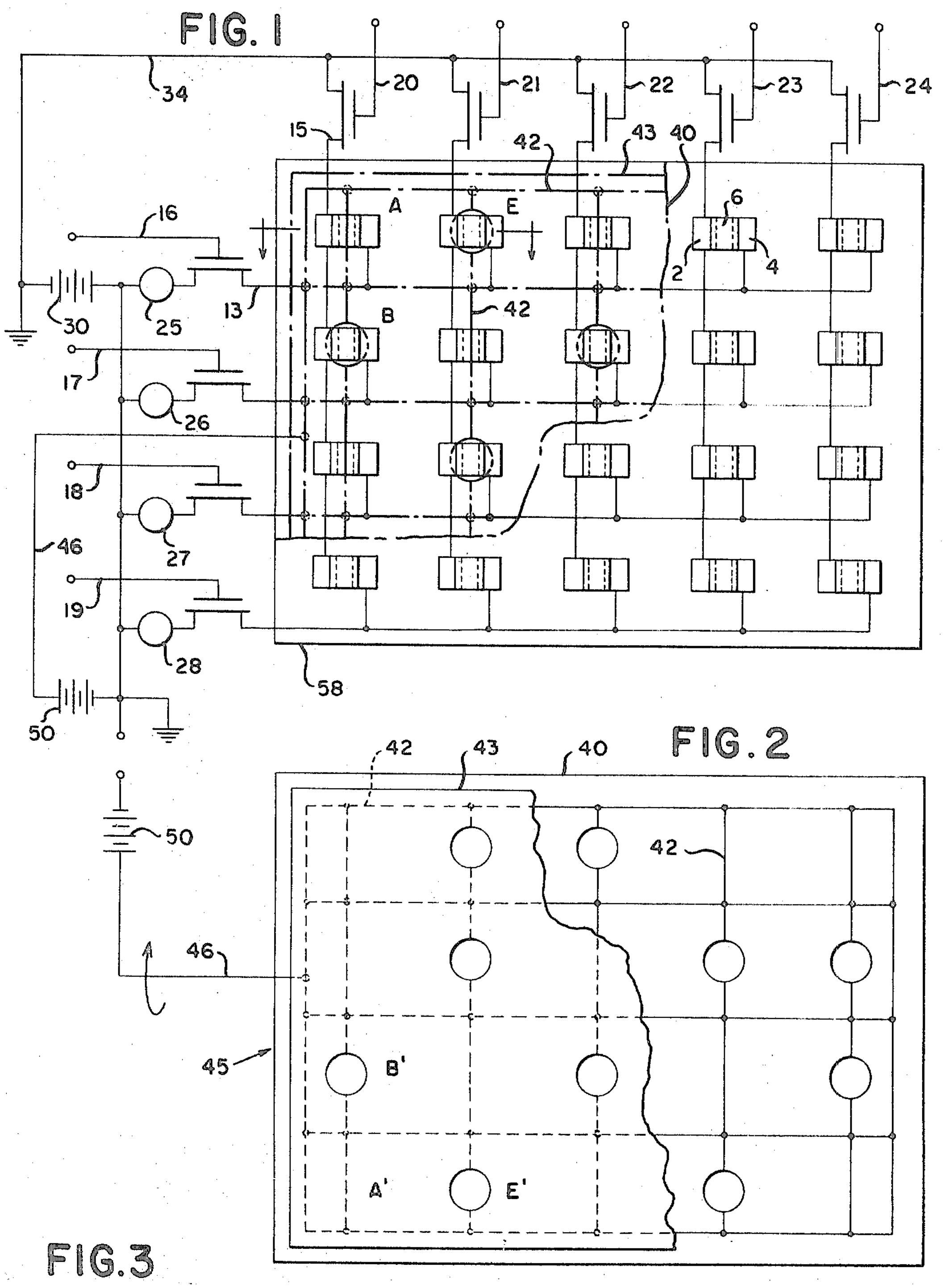
FIG. 1 is a plan view of a combined thin film-type read-only memory card reader, a read-only memory card, and sense circuit means.
FIG. 2 is a plan view of a read-only memory card.

A thin film-type read-only memory card reader is shown in FIG. 1. On one side of the nonconductive supporting substrate 1, such as a glass substrate, a matrix of source electrodes 2 and a matrix of drain electrodes 4, such as gold electrodes, are deposited by vacuum deposition; a source electrode 2 is separated from a drain electrode 4 by a distance of 10 microns. The distance from the centers of laterally adjacent source electrodes is 0.25 inch. A ceramic, porcelain, thermal plastic, or other nonconductive substrate may be used in place of a glass substrate.

Above, and in electrical contact with, the matrix of source electrodes 2, the matrix of drain electrodes 4, and the substrate 1 is vacuum-deposited a matrix of thin semiconductor material layers 6, as a matrix of 1-micron *n*-type cadmium sulfide layers 6, by vacuum deposition. A matrix of source electrode-semiconductor material-drain electrode elements is thus formed.

A read-only memory card 45 is also shown in FIG. 2. Upon a nonconductive supporting substrate 40, such as a 0.25-inch-thick Mylar supporting substrate, is placed an array of gate electrodes 42. The array of gate electrodes 42 is composed of 15-micron-thick copper strips, which are 0.25 inch apart. The array of gate electrodes 42 is selectively formed by chemically etching copper-coated Mylar supporting substrate 40 by the use of hydrochloric acid. A 0.00025-inch-dielectric coating 43 is laminated to the uncovered side of the array of gate electrodes 42. This dielectric coating acts as the insulator layer of a field effect transistor when a gate electrode of the array of gate electrodes 42 is placed in insulative contact with a semiconductor material layer 6.

The array of gate electrodes 42 on a nonconductive substrate 40 may be coded by punching holes through individual gate electrodes by the use of a card puncher. Alternatively, the array of gate electrodes may be coded by selectively chemically etching or by optically vaporizing gate electrodes from the array of gate electrodes 42. Information may thus be stored within the read-only memory card 45.

The matrix of source electrodes 2 are connected together by first copper conductors 13, as shown in FIG. 1. The matrix of drain electrodes 4 are connected together by second copper conductors 15. Source electrode switches 16 through 19 are connected to the first copper conductors 13. Drain electrode switches 20 through 24 are connected to the second copper conductors 15. Ammeters 25 through 28, which are connected to the series of source electrode switches 16 through 19, sense the passing of a source-drain current between the source electrodes 2 and the drain electrodes 4 of complete field effect transistors. A source-drain voltage battery 30 is connected between the drain electrode switches 20 through 24 and the ammeters 25 through 28 by means of a lead wire 34.

A gate voltage battery 50 is connected between the coded array of gate electrodes 42 of FIG. 2 and the ammeters 25 through 28 of FIG. 1 by a lead wire 46. The read-only memory card 45 of FIG. 2 is laid with the dielectric coating 43 against the matrix of thin semiconductor material layers 6, as shown in FIG. 1. The array of gate electrodes 42 is registered with the semiconductor material layers 6. The coded array of gate electrodes 42 will be approximately 0.00025 inch above the matrix of semiconductor material layers 6. A positive voltage from the gate voltage battery 50, of 10 volts, is applied to the coded array of gate electrodes 42 with respect to the array of source electrodes 2, through the lead wire 46.

A source electrode switch 16 and a drain electrode switch 20 are concurrently closed. A voltage from the source-drain voltage battery 30, of 5 volts, is applied between a source electrode and a drain electrode 4 of source electrode-semiconductor material-drain electrode element in position A. Current passes in the complete field effect transistor in position A, through the ammeter 25. The ammeter 25 therefore senses a complete field effect transistor in position A. This second sensed information may be stored in a computer memory as a one bit.

When the source electrode switch 17 and the drain electrode switch 20 are concurrently closed, current will not flow between the source electrode 2 and the drain electrode 4 of the source electrode-semiconductor material-drain electrode element in position B. The absence of current indicates that a field effect transistor does not exist in position B. This sensed information may be stored in a computer memory as a zero bit.

Figure 3:
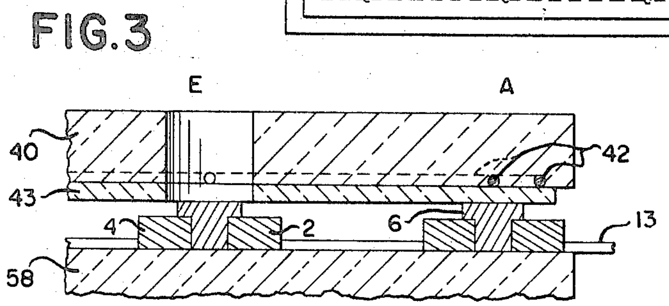
FIG. 3 is a sectional view of FIG. 1.

FIG. 3 is a sectional view of the combined read-only memory card 45 and of the thin film-type read-only memory card reader of FIG. 1. On the nonconductive supporting substrate 1 are located the source and drain electrodes 2 and 4 of source electrode-semiconductor material-drain electrode elements A and E. The semiconductor material layers 6 of these elements are therebetween. The dielectric layer 43 is in contact with the semiconductor material layer of these elements A and E. A gate electrode h 42 is in insulative contact with the semiconductor material layer 6 of element A to form an insulated gate field effect transistor above element A. A gate electrode, however, does not exist above element E. Therefore no field effect transistor is formed at the position of element E.

The gate electrode 42 is shown attached to the rigid supporting substrate 40.

Figure 4:
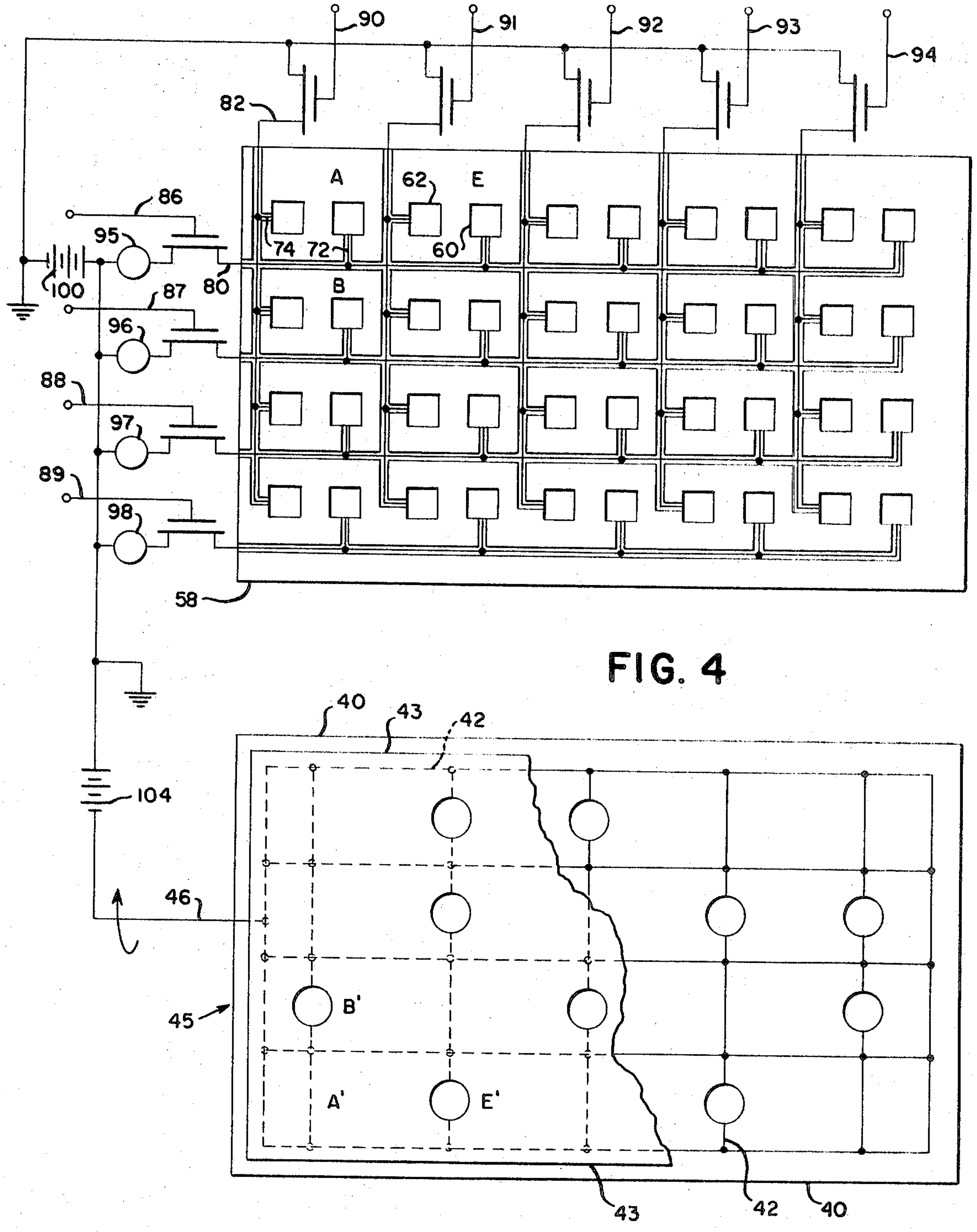
FIG. 4 is a plan view of a combined MOS-type read-only memory card reader, a read-only memory card, and sense circuit means.

An MOS-type read-only memory card reader is shown in FIG. 4. Into one side of an N-type silicon substrate 58 are diffused a matrix of P-type regions 60 and a matrix of P-type regions 62. Boron may be used to form P-type regions 60 and 62 in the N-type silicon substrate 58. A matrix of source electrodes 72 and a matrix of drain electrodes 74, such as indium electrodes, are deposited by evaporation and chemical etching onto the respective P-type regions 60 and 62. The matrix of source electrodes 72 and the matrix of drain electrodes 74 lie in channels in, and are insulated from, the substrate 58. The P-type regions 60 is separated from the P-type region 62 by a distance of 10 microns. The distance from the centers of laterally adjacent source electrodes 72 is 0.25 inch. A matrix of source electrode-semiconductor material-drain electrodes elements is thus formed.

The matrix of source electrodes 72 are connected together by first copper conductors 80, which lie in channels in, and are insulated from, the substrate 58. The matrix of drain electrodes 74 are connected together by second copper conductors 82, which lie in channels in the substrate 58. The second copper conductors 82 are insulated from the first copper conductors 80 and from the substrate 58. Source electrode switches 86 through 89 are connected to the first copper conductors 80. Drain electrode switches 90 through 94 are connected to the second copper conductors 82. Ammeters 95 through 98, which are connected to the series of source electrode switches 86 through 89, sense the passing of a source-drain current between the source electrodes 72 and the drain electrodes 74 of complete field effect transistors. A source-drain voltage battery 100 is connected between the drain electrode switches 90 through 94 and the ammeters 95 through 98.

A read-only memory card 45 may be laid upon the MOS-type read-only memory card reader. The dielectric coating 43 lies flat against the matrix of PNP-type semiconductor regions, due to the recessing of the matrix of source electrodes 72 and the matrix of drain electrodes 74 in channels in the substrate 58. The coded array of gate electrodes 42 is registered with the matrix of PNP-type semiconductor regions. The coded array of gate electrodes 42 will be approximately 0.00025 inch above the matrix of RNP-type semiconductor regions. A negative voltage from a gate voltage battery 104, of 20 volts, is connected between the coded array of gate electrodes 42 with respect to the array of source electrodes 72, through the lead wire 46.

The source electrode switch 86 and the drain electrode switch 90 are concurrently closed. A voltage from the source-drain voltage battery 100, of 5 volts, is applied between a source electrode 72 and a drain electrode 74 of source electrode-semiconductor material-drain electrode in position A. Current passes in the complete field effect transistor in position A, through the ammeter 95. The ammeter 95 therefore senses a complete field effect transistor in position A. This sensed information may be stored in a computer memory as a one bit.

When the source electrode switch 87 and the drain electrode switch 90 are concurrently closed, current will not flow between the source electrode 72 and the drain electrode 74 of the source electrode-semiconductor material-drain element in position B. The absence of current indicates that a field effect transistor does not exist in position B. This sensed information may be stored in a computer memory as a zero bit.

The read-only memory 45 of FIG. 2 contains 20 bits of information. However, the read-only memory 45 may be fabricated to contain any number of bits, depending upon the amount of information that is desired to be stored in such a read-only memory. Several read-only memories may be made, to form a library of information on them. These read-only memories, which have coded arrays of gate electrodes therein, may be read by passing them over the read-only memory card reader of FIG. 1 or FIG. 3, so as to read which gate electrode within said array of gate electrodes 42 of said read-only memory exist, and which gate electrodes of said array of gate electrodes 42 do not exist. Such read-only memories may be read in a sequential manner.

What is claimed is:

1. A read-only memory circuit comprising:

a. a complete array of source electrode-semiconductor material-drain electrode elements disposed on a nonconductive supporting substrate;

b. a coded array of dielectric coated gate electrodes mounted on another nonconductive supporting substrate, said coded array of dielectric coated gate electrodes being against said complete array of elements, in register therewith, and dielectrically insulated therefrom;

c. means for applying a gate voltage to said coded array of dielectric coated gate electrodes to reduce the resistance of the semiconductor material of the elements in register therewith; and d. means for applying a source-drain voltage to each source electrode-semiconductor material-drain electrode element to sense for the presence of a gate electrode above the source electrode-semiconductor material-drain electrode element.

2. A read-only memory card reader to be used in conjunction with a read-only memory card, so as to form a storage unit of bits of information, comprising:

a. a second nonconductive supporting substrate, b. a matrix of source electrodes attachably disposed on said second nonconductive supporting substrate, c. a matrix of drain electrodes attachably disposed on said second nonconductive supporting substrate in a close alternating arrangement with said source electrodes, and d. semiconductor material attachably disposed between said source electrodes and said adjacent drain electrodes of the matrix of source and drain electrodes, so as to form a matrix of source electrode-semiconductor material-drain electrode elements against which a coded array of gate electrodes may lie in insulative contact.

3. A read-only memory circuit for reading a read-only memory card with a read-only memory card reader, comprising:

a. a read-only memory card reader having a second nonconductive supporting substrate, a matrix of source electrodes attachably disposed on said second nonconductive supporting substrate, a matrix of drain electrodes attachably disposed on said second nonconductive supporting substrate in close alternating arrangement with said source electrodes, and semiconductor material attachably disposed between said source electrodes and said adjacent drain electrodes;

b. a read-only memory card in register with said read-only memory card reader having a first nonconductive supporting substrate, a coded array of gate electrodes attachably disposed on said first nonconductive supporting substrate, and a dielectric coating covering said coded array of gate electrodes in contact with said matrix of thin semiconductor material, the gate electrodes being in registration with said matrix of thin semiconductor material;

c. a set of first copper conductors, each connecting a row of the matrix of source electrodes;

d. a set of second copper conductors, each connecting a column of the matrix of drain electrodes;
e. a set of source electrode switches, each connected to a first copper conductor;
f. a set of drain electrode switches, each connected to a second copper conductor;
g. a set of ammeters, each connected to a source electrode switch;
h. a source-drain voltage battery connected between the connected ammeters and the connected drain electrode switches; and
i. a gate voltage battery connected between the connected ammeters and the coded array of gate electrodes so that a source-drain current will flow between a source electrode and a drain electrode when its corresponding source electrode switch and drain electrode switch are closed if a gate electrode exists thereabove and through the corresponding ammeter connected to said source electrode switch.

4. A method of reading a read-only memory card having a first nonconductive supporting substrate, a coded array of gate electrodes attachably disposed on said first nonconductive supporting substrate, and a dielectric coating covering said coded array of gate electrodes, by means of a read-only memory card reader having a second nonconductive supporting substrate, a matrix of source electrodes attachably disposed on said nonconductive supporting substrate, a matrix of drain electrodes attachably disposed on said second nonconductive supporting substrate in a close alternating arrangement with said source electrodes, and semiconductor material attachably disposed between said source electrodes and said adjacent drain electrodes of the matrix of source and drain electrodes, comprising:
a. placing the dielectric coating of the read-only memory card against the semiconductor material;
b. registering the coded array of gate electrodes with the semiconductor mate material between source and drain electrodes;
c. applying a gate voltage to the coded array of gate electrodes with respect to the array of source electrodes; and
d. applying a source-drain voltage between each source electrode and adjacent drain electrode, so as to pass a source-drain current if a gate electrode exists thereabove, so as to sense for the presence or absence of gate electrodes within the coded array of gate electrodes.